(12) United States Patent
Oberle et al.

(10) Patent No.: US 9,835,238 B2
(45) Date of Patent: Dec. 5, 2017

(54) MULTICOMPONENT GEAR

(71) Applicant: IMS GEAR SE & Co. KGaA, Donaueschingen (DE)

(72) Inventors: Stephan Oberle, Villingen-Schwenningen (DE); Markus Bernhard, Nenzingen (DE); Manuel Seidel, Dauchingen (DE); Christian Kutscher, Singen (DE); Eugen Stoppel, Muehlingen (DE)

(73) Assignee: IMS GEAR SE & Co. KGaA, Donaueschingen (DE)

( * ) Notice: Subject to any disclaimer, the term of this patent is extended or adjusted under 35 U.S.C. 154(b) by 382 days.

(21) Appl. No.: 14/594,605

(22) Filed: Jan. 12, 2015

(65) Prior Publication Data

US 2015/0308555 A1    Oct. 29, 2015

(30) Foreign Application Priority Data

Jan. 23, 2014 (EP) .................................... 14152297

(51) Int. Cl.
   *F16H 55/06*      (2006.01)
   *F16H 55/17*      (2006.01)
(52) U.S. Cl.
   CPC ............. *F16H 55/06* (2013.01); *F16H 55/17* (2013.01); *F16H 2055/065* (2013.01)
(58) Field of Classification Search
   CPC ...... B22D 19/0036; F16H 55/06; F16H 55/14
   (Continued)

(56) References Cited

U.S. PATENT DOCUMENTS 2,231,427 A * 2/1941 Larsh ................. B22D 19/0036
                                                    164/111
3,200,665 A * 8/1965 Wells ...................... F16H 55/06
                                                    474/161
(Continued)

FOREIGN PATENT DOCUMENTS

DE         31 09 153 A1      3/1982
DE         200 22 502        10/2001
(Continued)

OTHER PUBLICATIONS

Search report attached to the office action of the Chinese Patent Office for related Korean patent application 201510036144.7, dated Oct. 27, 2016.

(Continued)

*Primary Examiner* — Terence Boes
(74) *Attorney, Agent, or Firm* — Juneau & Mitchell

(57) ABSTRACT

The invention relates to a multicomponent gear having an outer part with a toothed rim, an inner part, and a connecting part made of plastic for the positive locking connection of the inner part and the outer part. The outer part is thereby arranged on an outer circumferential surface and the inner part is arranged on an inner circumferential surface of the connecting part. The connecting part is additionally provided with a plurality of indentations on two opposite primary surfaces lying outside and perpendicular to a rotational axis. The invention is thereby characterized in that the indentations in the first primary surface of the connecting part are, in comparison to the indentations in the second primary surface of the connecting part, arranged offset to each other radially and/or in the circumferential direction to the rotational axis.

10 Claims, 2 Drawing Sheets

(58) Field of Classification Search
USPC .......................................................... 74/446
See application file for complete search history.

(56) References Cited

U.S. PATENT DOCUMENTS

| | | | | |
|---|---|---|---|---|
| 3,651,705 | A | * | 3/1972 | Bertinetti ................ F16H 55/06 |
| | | | | 474/152 |
| 5,086,660 | A | * | 2/1992 | Swars ...................... F16D 1/06 |
| | | | | 74/439 |
| 6,684,729 | B2 | | 2/2004 | Bauseler |

FOREIGN PATENT DOCUMENTS

| | | |
|---|---|---|
| DE | 200 22 502 U1 | 10/2001 |
| DE | 101 27 224 A1 | 12/2002 |
| DE | 10 2012 10277 A1 | 10/2013 |
| JP | 2002-303362 | 10/2002 |
| JP | 2004-237842 | 8/2004 |
| JP | 2010-14253 | 1/2010 |
| JP | 2013-241953 | 12/2013 |

OTHER PUBLICATIONS

Search report attached to the search report of the European Patent Office for related German patent application 10 2014 200 271.0, dated Dec. 10, 2014.
Search report attached to the office action of the Korean Patent Office for related Korean patent application 10-2015-7883, dated Feb. 5, 2016.

* cited by examiner

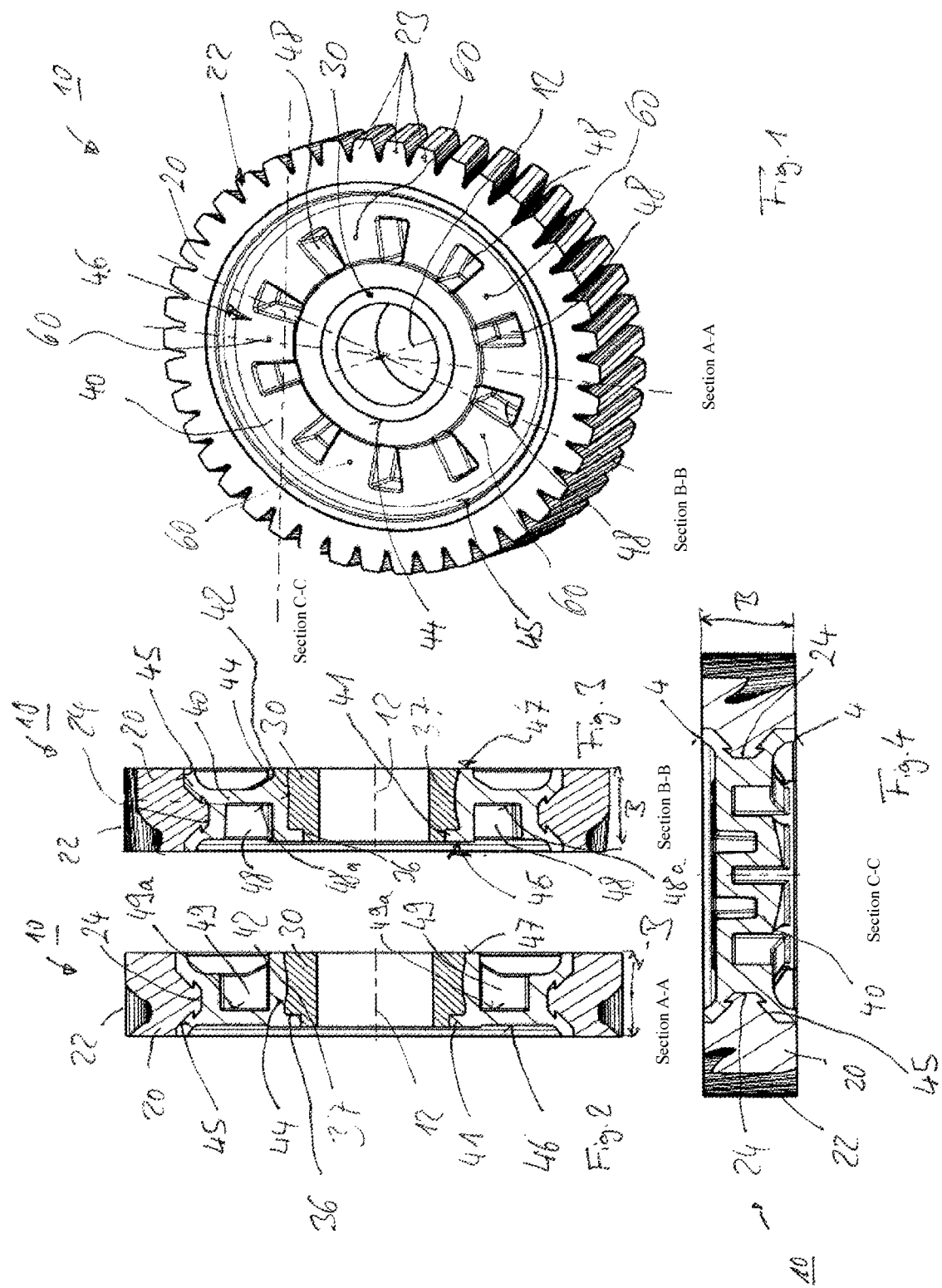

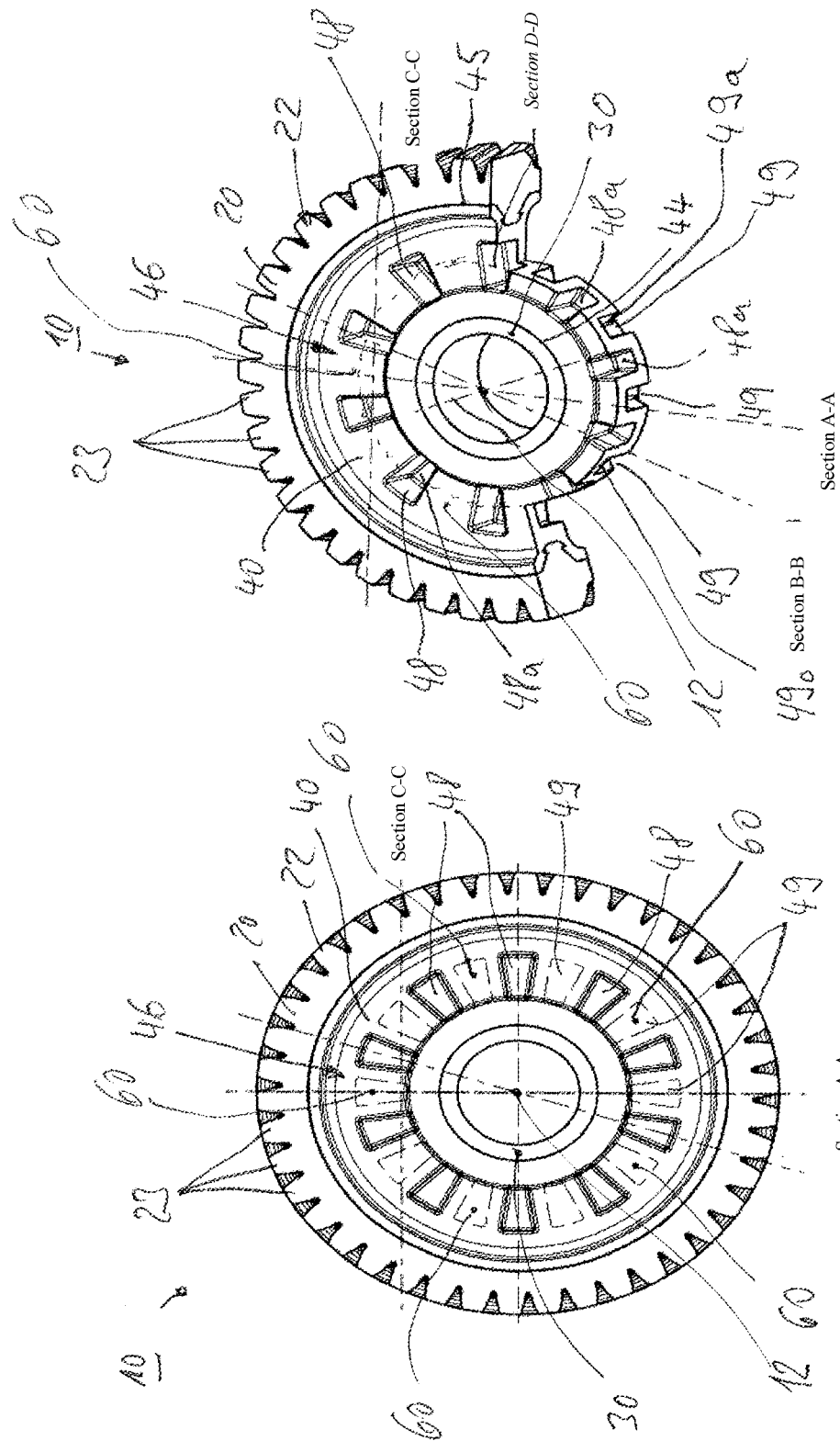

MULTICOMPONENT GEAR

CROSS REFERENCE TO RELATED APPLICATIONS

This patent application claims priority to European Patent Application 14 152 297.9, filed on Jan. 23, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to a multicomponent gear.

Background of the Invention

A multi component gear of this type, as is used for example for electric steering of motor vehicles, is known from EP 1 777 439 B1. This multicomponent gear consists substantially of three components. The actual toothed rim is formed by an outer part, which consists of plastic and has a multitude of teeth for forming the toothed rim. The toothed rim has on the inner side an insert part 3, which is conventionally formed as a hub or shaft. This inner part thereby consists generally of metal, preferably steel. The outer part with the toothed rim thereof and the inner part are connected to each other in a positive locking way via a connecting part, which is produced by cone gate injection molding. The connecting part, injection molded of plastic, has reinforcing ribs on the two opposite primary surfaces thereof, i.e. the exterior annular surfaces lying perpendicular to the rotational axis, which ribs extend in the radial direction from the conceived center of the rotational axis, starting from the inner part in the direction of the outer part and thus to the toothed rim. In addition, the two primary surfaces of the connecting part have an annular reinforcing ring facing the inner part and a further reinforcing ring facing the outer part. The reinforcing ribs extend radially between these two reinforcing rings. If a radial section through this connecting part is viewed between the aforementioned reinforcing ribs, then an H-shaped cross sectional contour of the circumferential connecting part is shown.

DE 101 27 224 A1 also discloses different embodiments of multicomponent gears. FIG. 8 thereof likewise shows a multicomponent gear having an inner metal hub and a toothed rim made of plastic, wherein this toothed rim is connected to the metal hub via a plastic disk having reinforcing ribs arranged on both primary surfaces. FIG. 10 thereof also shows a connecting part designed with an H-shape in cross section.

It has become apparent that multicomponent gears of this type are in need of improvement, in particular when only limited installation space and in particular when a limited gear width is available and despite this a gear that is axially as rigid as possible must be provided. Ideally, a very axially rigid gear could be provided by a gear body made of solid material. This fails, however, when using plastic in the production process. Namely, the production of thick-walled plastic bodies has the problem of cavity formation. This is understood to mean the occurrence during injection molding of plastics of undesired hollow spaces in the inside of an injection molded workpiece or dents on the surface thereof. The thicker the walls of an injection molded workpiece, the higher the likelihood that this type of cavities will occur. It would indeed be theoretically possible to form the inner part with an H-cross section. For rotationally symmetrical wheel bodies, like gears, however, a cross section of this type cannot be implemented, as the corresponding hollow spaces cannot be injected.

The goal of the invention is to provide a multicomponent gear which uses relatively little material and despite this is distinguished by a high axial rigidity.

BRIEF SUMMARY OF THE INVENTION

In a preferred embodiment, a multicomponent gear comprising: an outer part with a toothed rim, an inner part, a connecting part made of plastic for the positive locking connection of the inner part and the outer part, wherein the outer part is arranged on an outer circumferential surface and the inner part is arranged on an inner circumferential surface of the connecting part and the connecting part is additionally provided with a plurality of indentations on each of a first and second opposite primary surface lying outside and perpendicular to a rotational axis, and wherein the indentations in the first primary surface of the connecting part are, in comparison to the indentations in the second primary surface of the connecting part, arranged offset to each other radially and/or in the circumferential direction to the rotational axis.

In another preferred embodiment, the multicomponent gear as described herein, wherein the indentations are arranged on the first primary surface relative to the indentations in relation to the second primary surface of the connecting part and to each other such that a section lying parallel to the rotational axis or a section concentric to the rotational axis through the multicomponent gear shows a meandering pattern or at least an approximately meandering patterned course of the connecting part.

In another preferred embodiment, the multicomponent gear as described herein, wherein at least one part of the indentations on the first primary surface or on the second primary surface extend across more than half of the width of the connecting part and are formed as pot-shaped having a bottom, respectively.

In another preferred embodiment, the multicomponent gear as described herein, wherein the outer part is formed of plastic.

In another preferred embodiment, the multicomponent gear as described herein, wherein the inner part consists of metal and is either a metal ring or a metal shaft.

In another preferred embodiment, the multicomponent gear as described herein, wherein the first primary surface as well as the second primary surface is provided with a plurality of indentations, which run in a single row spaced apart from each other on each of the two primary surfaces at an identical radial distance from the rotational axis.

In another preferred embodiment, the multicomponent gear as described herein, wherein the outer part has an inner circumferential surface with a ribbing or toothing structure.

In another preferred embodiment, the multicomponent gear as described herein, wherein the inner part has at least one annular recess facing the connecting part, into which recess the connecting part engages with an annular protruding flange.

In another preferred embodiment, the multicomponent gear as described herein, wherein the connecting part has on at least one of the two primary surfaces thereof multiple gating points, which are arranged respectively between two of the indentations.

In another preferred embodiment, the multicomponent gear as described herein, wherein the inner circumferential surface as well as the outer circumferential surface of the connecting part have, when viewed in cross section, a width, which corresponds to the width of the multicomponent gear or at least approximates the width of the multicomponent gear.

In another preferred embodiment, the multicomponent gear as described herein, wherein the first primary surface as well as the second primary surface of the connecting part are formed as concave.

BRIEF DESCRIPTION OF THE DRAWINGS

FIG. 1 is a line drawing evidencing a perspective view of an embodiment of a multicomponent gear according to the invention viewed obliquely from the front at a first primary surface of the multicomponent gear.

FIG. 2 is a line drawing evidencing a section view through the multicomponent gear from FIG. 1 along the section line A-A of FIG. 1.

FIG. 3 is a line drawing evidencing a section view along the section line B-B of the multicomponent gear of FIG. 1.

FIG. 4 is a line drawing evidencing a section view along the section line C-C of the multicomponent gear of FIG. 1.

FIG. 5 is a line drawing evidencing a top view of the first primary surface 46 of the multicomponent gear 10.

FIG. 6 is a line drawing evidencing a similar perspective view of the multicomponent gear as in FIG. 1, wherein this, however, is depicted partly broken off along a section D-D lying concentric to the rotational axis.

DETAILED DESCRIPTION OF THE INVENTION

The invention described herein provides a multicomponent gear which uses relatively little material and despite this is distinguished by a high axial rigidity. Specifically, the invention comprises a plurality of recesses are respectively provided on the two primary surfaces of the connecting part consisting of plastic; these recesses are, however, offset radially and/or axially to each other from one surface to the other, such that these mutually mesh with each other.

The recesses on the two primary surfaces are thereby selected and arranged offset to each other such that these result in a meandering patterned course across the wall of the connecting part when viewed in a section view parallel to the rotational axis.

The recesses are thereby preferably formed relative to the rotational axis at least half as thick or wide as the gear or the connecting part, and thereby formed as pot-shaped having a bottom.

It lies within the context of the present invention that the outer part is made of plastic, also fiber-reinforced if necessary, and the inner part is made of metal. The inner part can thereby be formed as a hub, in particular as a steel hub, or also as a shaft. The remaining developments of the invention will be explained in more detail by means of the following embodiment in connection with the figures.

DETAILED DESCRIPTION OF THE FIGURES

FIG. 1 shows in perspective representation an embodiment of a multicomponent gear 10, as can be used for example as a worm gear for electric steering in a motor vehicle. This multicomponent gear 10 consists of multiple parts, which are rotationally symmetrically arranged radially around a rotational axis 12. The multicomponent gear 10 consists of an outer part 20 which is provided on the outer peripheral surface 25 with a plurality of teeth 23 for forming a toothed rim 22. The outer part 20 consists preferably of an unreinforced plastic. The outer part 20 has an inner circumferential surface 24, which in the embodiment depicted (compare herewith the sectional views in FIGS. 2, 3, and 4) does not have a constant diameter to the rotational axis 12 and therefore runs in a cogged pattern when viewed sectionally. A toothed or mutually meshing structure of this type improves the cohering of the outer part 20 and the connecting part 40 to be subsequently described. A connecting part 40 connects to this inner circumferential surface 24, which connecting part realizes a positive locking connection between the outer part 20 and an inner part 30 lying inward.

The inner part 30 can, as depicted, be an annular hub, in particular a metal hub, and preferably a steel hub. In the embodiment depicted, the annular inner part 30 has an inner circumferential surface 34, which can be attached on a shaft, and also an outer circumferential surface 35.

Although in the depiction of FIG. 1, an annular hub is depicted as the inner part 30, it is just as possible to directly provide a shaft, in particular a metal shaft as the inner part 30, instead of this annular inner part.

A positive locking fixing of the outer part 20 and the inner part 30 is guaranteed via the connecting part 40 in that said connecting part is configured as an injection molded part made of plastic. To produce this connecting part 40, the outer part 20 and the inner part 30 are placed in a molding tool and the connecting part 40 is subsequently injection molded, so that it has the form configured in FIGS. 1 to 4. The inner part 30 can thereby be produced during the injection molding process using a so-called pinpoint gate. Expediently, multiple gating points, e.g. five gating points are thereby provided. These multiple gating points are placed expediently rotationally symmetrically at the same angle to each other in the molding tool. In the figures, the gating points are provided with the reference 60.

To achieve as axially rigid a wheel body as possible, the connecting part 40 is configured such that as much material as possible is available to the two primary surfaces 46, 47. This is achieved in that each of the two primary surfaces 46, 47 is provided with a plurality of pocket-shaped indentations 48, 49. The first primary surface 46 of the connecting part 40 is the annular surface of the connecting part 40 facing the observer in FIG. 1, which surface is perpendicular to the rotational axis 12. The second primary surface 47 of the connecting part 40 cannot be seen in FIG. 1 and faces away from the observer. According to FIG. 1, multiple, in the present case ten, pocket-shaped indentations 48 are incorporated into the annular first primary surface 46, wherein the indentations 48 each have a bottom 48a, which respectively form a wall section of the opposing second primary surface 47 of the connecting part 40. The indentations 48 are arranged annularly to each other and respectively offset to each other by 36°. These indentations 48 are, relative to the rotational axis 12, situated on the first primary surface 46 at an identical radial distance to each other. As depicted, the indentations 48 increase somewhat in size in the direction of the outer part 20.

Ten indentations 49 are likewise arranged on the second primary surface 47 of the connecting part 40. These indentations are likewise configured as pot-shaped and have a bottom 49a, which respectively forms a wall section of the first primary surface 46 of the connecting part 40. These indentations 49 are indicated in FIG. 1 by dotted lines. As depicted, these indentations 49 are situated on the second primary surface 47 of the connecting part 40 radially and in the peripheral direction to the indentations 48 on the first primary surface 46 of the connecting part 40, such that these indentations lie respectively between the indentations 48.

This configuration guarantees an axially rigid connecting part 40, in which as much material of the connecting part 40 as possible is present on the outer sides, thus on the primary surfaces 46, 47. This will be especially clear by means of the sectional depictions in FIG. 2.

FIG. 2 shows the multicomponent gear 10 from FIG. 1 in a sectional view along a section line A-A. This section line runs between two indentations 48 on the first primary side 46 and cuts through two indentations 49 on the second primary side 47 of the connecting part 40.

FIG. 3 shows the multicomponent gear 10 from FIG. 1 along the section line B-B in a sectional view slightly radially offset to section A-A. In this section B-B, two indentations 48 of the connecting part 40 are cut through. These indentations 48 can be clearly seen in FIG. 3.

FIG. 4 finally shows the multicomponent gear 10 from FIG. 10 [sic: 1] along a section C-C, which is taken along a secant, which cuts through the two upper indentations 48 of the first primary surface 46 of the connecting part 40. In this section C-C, three indentations 49 on the second primary surface 47 are cut through at the same time. It can thereby clearly be seen that a meandering patterned course of the walls of the connecting part 40 arises between these collective five indentations 48, 49. This meandering patterned course of the walls of the connecting part 40 ensures the necessary axial rigidity of the connecting part 40 and thus of the entire multicomponent gear 10. The meandering patterned course of the walls of the connecting part 40 is characterized by an alternating jumping of wall sections of the connecting part 40 on the first and second primary surfaces 46, 47, wherein these wall sections are determined by the bottoms 48a, 49a of the indentations 48, 49.

FIG. 5 shows the multicomponent gear 10 in a top view and FIG. 6 in a partially broken perspective depiction. The section line runs thereby along a section D-D guided concentrically to the rotational axis 12 of the multicomponent gear 10. The radius of the section D-D is selected such that it cuts through the indentations 48, 49 and jumps from the half circumferential surface of the multicomponent gear 10 back to the outer circumferential surface of the multicomponent gear 10. The meandering patterned course of the connecting part 40 between the indentations 48, 49 on the two primary surfaces 46, 47 can be seen particularly well in the depiction of FIG. 6. Likewise, it can easily be seen how the outer part 20 protrudes with the inner circumferential surface 24 thereof into a circumferential groove of the outer surface 45 of the connecting part 40.

As can be seen from the sectional depictions in FIGS. 2, 3, and 4, the inner part 30 has namely an inner circumferential surface 34 with a constant diameter. The outer circumferential surface 35 has, however, an annular recess 36, into which an annular projection 41 of the connecting part 40 engages on the side facing the first primary surface 46 of the of the connecting part 40. An improved positive locking connection is hereby ensured between the connecting part 40 and the inner part 30. For further improvement of the positive locking connection, the outer circumferential surface 35 of the inner part 30 can also be provided with suitable toothing, knurling, ribbing, or also grooves, so that the injection molded material has an increased contact surface. During selection of a toothing structure, this can also be selected as globoid shaped.

Furthermore, it has proven to be favorable to configure the two primary surfaces 46, 47 of the connecting part 40 as somewhat concave. This can be seen on the bends in the sectional depictions left and right in the FIGS. 2 to 4. Additional installation space lateral to the multicomponent gear 10 is hereby gained for other necessary components of an electrical load, for example ball bearings or sensors.

Even though in the embodiment depicted, the indentations 48 on the first primary surface 46 of the connecting part 40 are disclosed as preferably radially offset to each other in comparison to the indentations 49 of the second primary surface 47 of the connecting part 40, it is naturally within the context of the invention that the indentations 48, 49 on the two primary surfaces 46, 47 are not only offset to each other in the circumferential direction, but are also or only offset radially to each other relative to the rotational axis 12. This means e.g. that the indentations 48 are radially closer to the inner part 30 and the indentations 49 in the same circumferential direction are radially closer to the outer part 20 between the indentations 48 and the outer part 20, or vice versa. It can also hereby be ensured that as much material of the connecting part 40 as possible is available on the two outer surfaces 46, 47. Nevertheless, the arrangement of the indentations 48, 49, presented in connection with the embodiments shown, is more optimal, because the connecting part 40 is thus clearly more rigid. The rigidity of the connecting part 40 can still be improved in that the connecting part 40 is formed of reinforced, in particular, fiber-reinforced plastic.

LIST OF REFERENCE NUMERALS

10 Gear
12 Rotational axis
20 Outer part
22 Toothed rim
23 Teeth
24 Inner circumferential surface
25 Outer circumferential surface
30 Inner part
34 Inner circumferential surface
35 Outer circumferential surface
36 Annular recess
40 Connecting part
41 Annular flange
44 Inner circumferential surface of the connecting part 40
45 Outer circumferential surface of the connecting part 40
46 First primary surface
47 Second primary surface
48 Indentations in the first primary surface 46
48a Bottom
49 Indentations in the second primary surface 47
49a Bottom
60 Gating points
A-A Section
B-B Section
C-C Section
D-D Concentric section
B Width of the inner part The references recited herein are incorporated herein in their entirety, particularly as they relate to teaching the level of ordinary skill in this art and for any disclosure necessary for the commoner understanding of the subject matter of the claimed invention. It will be clear to a person of ordinary

We claim:

1. A multicomponent gear comprising:
   an outer part with a toothed rim,
   an inner part,
   a connecting part made of plastic for the positive locking connection of the inner part and the outer part, wherein the outer part is arranged on an outer circumferential surface and the inner part is arranged on an inner circumferential surface of the connecting part and the connecting part is additionally provided with a plurality of indentations on each of a first and second opposite primary surface lying outside and perpendicular to a rotational axis,
   and wherein:
   the indentations in the first primary surface of the connecting part are, in comparison to the indentations in the second primary surface of the connecting part, arranged offset to each other in the circumferential direction to the rotational axis, and
   at least one part of the indentations on the first primary surface or on the second primary surface extend across more than half of the width of the connecting part between the first primary surface and the second primary surface and are formed pot-shaped and having a bottom, respectively.

2. The multicomponent gear of claim 1, wherein the indentations are arranged on the first primary surface relative to the indentations in relation to the second primary surface of the connecting part and to each other such that a section lying parallel to the rotational axis or a section concentric to the rotational axis through the multicomponent gear shows a meandering pattern or at least an approximately meandering patterned course of the connecting part.

3. The multicomponent gear of claim 1, wherein the outer part is formed of plastic.

4. The multicomponent gear of claim 1, wherein the inner part consists of metal and is either a metal ring or a metal shaft.

5. The multicomponent gear of claim 1, wherein the first primary surface as well as the second primary surface is provided with a plurality of indentations, which run in a single row spaced apart from each other on each of the two primary surfaces at an identical radial distance from the rotational axis.

6. The multicomponent gear of claim 1, wherein the outer part has an inner circumferential surface with a ribbing or toothing structure.

7. The multicomponent gear of claim 1, wherein the inner part has at least one annular recess facing the connecting part, into which recess the connecting part engages with an annular protruding flange.

8. The multicomponent gear of claim 1, wherein the connecting part has on at least one of the two primary surfaces thereof multiple gating points, which are arranged respectively between two of the indentations.

9. The multicomponent gear of claim 1, wherein the inner circumferential surface as well as the outer circumferential surface of the connecting part have, when viewed in cross section, a width, which corresponds to the width of the multicomponent gear or at least approximates the width of the multicomponent gear.

10. The multicomponent gear of claim 1, wherein the first primary surface as well as the second primary surface of the connecting part are formed as concave.

* * * * *